United States Patent
Morikawa et al.

(10) Patent No.: US 6,696,516 B2
(45) Date of Patent: Feb. 24, 2004

(54) THERMOPLASTIC ELASTOMER COMPOSITION

(75) Inventors: Akihiko Morikawa, Tokyo (JP); Hideo Nakanishi, Tokyo (JP); Kentarou Kanae, Tokyo (JP); Minoru Maeda, Tokyo (JP)

(73) Assignee: JSR Corporation, Tokyo (JP)

( * ) Notice: Subject to any disclaimer, the term of this patent is extended or adjusted under 35 U.S.C. 154(b) by 26 days.

(21) Appl. No.: 10/009,492

(22) PCT Filed: Apr. 19, 2001

(86) PCT No.: PCT/JP01/03369

§ 371 (c)(1),
(2), (4) Date: Dec. 13, 2001

(87) PCT Pub. No.: WO01/81462

PCT Pub. Date: Nov. 1, 2001

(65) Prior Publication Data

US 2002/0183441 A1 Dec. 5, 2002

(30) Foreign Application Priority Data

Apr. 21, 2000 (JP) ........................................ 2000-121388

(51) Int. Cl.[7] .................................................. C08L 23/16
(52) U.S. Cl. ......................... 524/526; 525/240; 525/244
(58) Field of Search ................................. 525/240, 244; 524/526

(56) References Cited

U.S. PATENT DOCUMENTS

| | | | |
|---|---|---|---|
| 4,650,830 A | | 3/1987 | Yonekura et al. |
| 5,677,382 A | * | 10/1997 | Tsuji et al. |
| 5,691,413 A | * | 11/1997 | Morikawa et al. |
| 5,914,372 A | * | 6/1999 | Hasegawa et al. |
| 6,153,704 A | | 11/2000 | Kodama et al. |

FOREIGN PATENT DOCUMENTS

| | | |
|---|---|---|
| EP | 844279 | 5/1998 |
| EP | 0 930 337 | 7/1999 |
| EP | 0 930 337 A2 * | 7/1999 |
| JP | 57-29441 | 2/1982 |
| JP | 59-221347 | 12/1984 |
| JP | 61-53933 | 11/1986 |
| JP | 11-269325 | 10/1999 |

OTHER PUBLICATIONS

U.S. application Ser. No. 09/926,426 filed Jan. 14, 2001 Morikawa, et al.*
U.S. application Ser. No. 10/009,492 filed Dec. 13, 2001 Morikawa, et al.*
U.S. application Ser. No. 10/343,834 filed Feb. 10, 2003 Kanae, et al.*

* cited by examiner

Primary Examiner—Robert Harlan
(74) Attorney, Agent, or Firm—Oblon, Spivak, McClelland, Maier & Neustadt, P.C.

(57) ABSTRACT

The thermoplastic elastomer composition in the present invention comprises an ethylene.α-olefinic copolymeric rubber (A) whose intrinsic viscosity [η] determined at 135° C. in decalin solvent is 3.5 to 6.8 dl/g, a mineral oil-based softener (B), an α-olefinic crystalline polymer (C) whose degree of crystallinity is 50% or higher and an α-olefinic amorphous polymer (D) whose melt viscosity at 190° C. is 50,000 cPs or less and whose degree of crystallinity is less than 50%, and at least a part of a mixture containing 20 to 63% by mass of the (A), 35 to 78% by mass of the (B), 1 to 12% by mass of the (C) and 1 to 12% by mass of the (D), based on 100% by mass of the total of the components (A), (B), (C) and (D), is crosslinked.

22 Claims, No Drawings

THERMOPLASTIC ELASTOMER COMPOSITION

FIELD OF THE INVENTION

The present invention relates to a thermoplastic elastomer composition whose rubber products give a vulcanized rubber-like flexibility and rubbery nature as well as low hardness and low compression set and which is excellent in terms of an injection fusibility.

BACKGROUND ART

While a gasket having a sophisticated shape such as an automobile gasket and a building gasket can be made using a vulcanized rubber, its manufacturing process is extremely complicated since a linear part and a curved part to be attached thereto should be produced separately. Accordingly, it becomes a trend that a curved part, whose process tends to be complicated especially, is produced using a thermoplastic elastomer, which allows a labor-saving process and an improved producibility to be achieved, as a substitute of a vulcanized rubber. Among such elastomers, an olefinic thermoplastic elastomer has a combination of several excellent properties such as (1) excellent heat resistance, ozone resistance and weather resistance, (2) a vulcanized rubber-like nature, (3) a moldability almost comparable with that of an olefinic thermoplastic resin such as polyethylenes and polypropylenes, (4) no need of a secondary vulcanizing step required for a vulcanized rubber and (5) a recyclability and the like. Nevertheless, such olefinic thermoplastic elastomer involves an extreme difficulty in obtaining a sufficient adhesion with a vulcanized rubber or a non-vulcanized rubber.

Among the elastomers, one known as a flexible olefinic thermoplastic elastomer employed preferably in the curved part of the gasket employed in an automobile window seal, door seal, trunk seal and the like, and a gasket employed as a building material which should have a rubbery nature especially is one having a high ethylene.α-olefinic copolymeric rubber content. However, this elastomer has a poor fluidity upon melting and is difficult to be molded by an injection molding which is the most widely employed molding process.

In addition, such elastomer is problematic also since it still possesses a resin-like nature and is hard when compared with a vulcanized rubber and thus is poor with regard to a rubbery texture or the like. On the other hand, a method for fusing molded articles of olefinic thermoplastic elastomers with each other is disclosed for example in Japanese Patent Publication No. Sho-61-53933, Japanese Unexamined Patent Publication No. Sho-59-221347 and the like, but it still involves a problem which is experienced as a difficulty in achieving a sufficient adhesion especially when an article to be fused is a molded article made of an olefinic vulcanized rubber or the like.

Also when a molded article which has an especially low hardness and a high flexibility such as an irregularly extruded article of a vulcanized foam rubber is employed as a linear part, it should be fused using a thermoplastic elastomer which has an ultimate rubbery nature in terms of a low hardness, a high flexibility and the like.

This invention is intended to solve the problems described above and its objective is to provide a thermoplastic elastomer which has a low hardness, an excellent flexibility, a satisfactory rubbery nature, an excellent fluidity and injection fusibility upon molding, as well as an excellent strength of the adhesion both to an olefinic vulcanized rubber and an olefinic thermoplastic elastomer composition and also a high strength of adhesion especially to a vulcanized foam rubber.

DISCLOSURE OF THE INVENTION

The thermoplastic elastomer composition of the invention is comprising an ethylene.α-olefinic copolymeric rubber (A) whose intrinsic viscosity [η] determined at 135° C. in decalin solvent is 3.5 to 6.8 dl/g, a mineral oil-based softener (B), an α-olefinic crystalline polymer (C) whose degree of crystallinity is 50% or higher and an α-olefinic amorphous polymer (D) whose melt viscosity at 190° C. is 50,000 cPs or less and whose degree of crystallinity is less than 50%, and at least a part of a mixture containing 20 to 78% by mass of the (A), 20 to 78% by mass of the (B), 1 to 12% by mass of the (C) and 1 to 12% by mass of the (D), based on 100% by mass of the total of the (A), (B), (C) and (D), is crosslinked.

The "ethylene.α-olefinic copolymeric rubber" described above (hereinafter referred to simply as "copolymeric rubber (A)") means a copolymeric rubber whose main constituent unit is ethylene and an α-olefin except ethylene. The copolymeric rubber preferably contains 90% by mole or more of ethylene and the α-olefin based on 100% by mole of the entire constituent units. The amount less than 90% by mole is not preferable since it leads to a reduction in the flexibility or the mechanical strength of a molded article made using the thermoplastic elastomer composition of the invention.

The α-olefin described above constituting the copolymeric rubber described above may for example be an α-olefin having 3 to 12 carbon atoms such as propylene, 1-butene, 1-pentene, 3-methyl-1-butene, 1-hexene, 3-methyl-1-pentene, 4-methyl-1-pentene, 3-ethyl-1-pentene, 1-octene, 1-decene, 1-undecene (two or more of which may be employed in combination). Among those listed above, propylene and 1-butene are preferred.

Other constituent unit may be a non-conjugated diene. Such non-conjugated diene may for example be 1,4-pentadiene, 1,4-hexadiene, 1,5-hexadiene, 1,7-octadiene, 1,9-decadiene, 3,6-dimethyl-1,7-octadiene, 4,5-dimethyl-1,7-octadiene, 5-methyl-1,8-nonadiene, dicyclopentadiene, 5-ethylidene-2-norbornene, 5-vinyl-2-norbornene, 2,5-norbornadiene, and the like, which may be employed alone or in combination of two or more. Among those listed above, dicyclopentadiene and 5-ethylidene-2-norbornene are preferred.

Thus, the copolymeric rubber (A) described above may preferably be used an ethylene.α-olefin binary copolymer, an ethylene.α-olefin non-conjugated diene ternary copolymer, a combination thereof and the like.

The ethylene.α-olefin binary copolymer may for example be ethylene-propylene copolymer (hereinafter abbreviated as EPM), ethylene.α-butene copolymer (hereinafter abbreviated as EBM), ethylene.α-pentene copolymer, ethylene.3-methyl-1-butene copolymer, ethylene.1-hexene copolymer, ethylene.3-methyl-1-pentene copolymer, ethylene.4-methyl-1-pentene copolymer, ethylene.3-ethyl-1-pentene copolymer, ethylene.1-octene copolymer, ethylene.1-decene copolymer, ethylene.1-undecene copolymer and the like. Among those listed above, EPM and EBM are preferred. Any of these copolymers may be employed alone or in combination of two or more.

When EPM and/or EBM is employed as the ethylene.α-olefin binary copolymer described above, ethylene content is preferably 50 to 95% by mole (more preferably 60 to 90% by mole) based on 100% by mole of the entire copolymers.

The ethylene.α-olefin non-conjugated diene ternary copolymer described above is especially ethylene.propylene.dicyclopentadiene ternary copolymer, ethylene.propylene.5-ethylidene-2-norbornene ternary copolymer, ethylene.1-butene.dicyclopentadiene ternary copolymer and ethylene.1-butene.5-ethylidene-2-norbornene ternary copolymer preferred. The ethylene content in such ternary copolymer is preferably 50 to 95% by mole (more preferably 60 to 90% by mole) based on 100% by mole of the total of ethylene unit and propylene unit or 1-butene unit. The dicyclopentadiene or 5-ethylidene-2-norbornene content is preferably 3 to 10% by mole (more preferably 3 to 8% by mole) based on 100% by mole of the total of ethylene unit and propylene or 1-butene unit.

The ethylene contents in the binary copolymer and the ternary copolymer described above less than 50% by mole lead to a reduction in the crosslinking efficiency (especially when using an organic peroxide as a crosslinking agent), resulting in a difficulty in obtaining a satisfactory physical property intended. On the other hand, the ethylene contents exceeding 95% by mole lead to an undesirable reduction in the flexibility of the copolymeric rubber.

In addition to the binary copolymer described above, the ternary copolymer described above and the like, a halogenated copolymer resulting from a replacement of a part of the hydrogen atoms possessed by each copolymer described above with halogen atoms such as chlorine and bromine atoms, as well as a graft copolymer of the binary copolymer, the ternary copolymer, the halogenated copolymer or the like described above obtained by graft-copolymerizing using an unsaturated monomer such as vinyl chloride, vinyl acetate, (meth)acrylic acid, (meth)acrylic acid derivative [methyl (meth)acrylate, glycidyl (meth)acrylate, (meth) acrylamide and the like], maleic acid, maleic acid derivative (maleic anhydride, maleimide, dimethyl maleate and the like), a conjugated diene (butadiene, isoprene, chloroprene and the like) or the like, may be employed as the copolymeric rubber in the present invention. Any of these copolymers may be employed alone or in combination of two or more.

The copolymeric rubber described above can be produced by a low or medium pressure polymerization method such as a method in which ethylene, an α-olefin and a non-conjugated diene are polymerized in the presence of a catalyst consisting of a Ziegler-Natta catalyst and a solvent containing a soluble vanadium compound and an organic aluminium compound optionally with a supply of hydrogen as a molecular weight modifier. Such polymerization may be performed also by a gas phase method (fluidized bed or agitating bed), a liquid phase method (slurry method or solution method).

The soluble vanadium compound is preferably be a reaction product between at least one selected from the group consisting of VOCl$_3$ and VCl$_4$ with an alcohol. Such alcohol may for example be methanol, ethanol, n-propanol, isopropanol, n-butanol, sec-butanol, t-butanol, n-hexanol, n-octanol, 2-ethylhexanol, n-decanol, n-dodecanol and the like. Among these, an alcohol having 3 to 8 carbon atoms are preferred.

The organic aluminium compound may for example be triethylaluminium, triisobutylaluminium, tri-n-hexylaluminium, diethylaluminium monochloride, diisobutylaluminium monochloride, ethylaluminium sesquichloride, butylaluminum sesquichloride, ethylaluminium dichloride, butylaluminium dichloride, a reaction product of trimethylaluminium and water, i.e., methyl aluminoxane and the like. Among these, ethylaluminium sesquichloride, butylaluminium sesquichloride, a mixture of ethylaluminium sesquichloride and triisobutylaluminium and a mixture of triisobutylaluminium and butylaluminium sesquichloride are employed preferably.

The solvent described above is preferably a hydrocarbon solvent, n-pentane, n-hexane, n-heptane, n-octane, isooctane, cyclohexane and the like are preferred particularly. Any of these solvents may be employed alone or in combination of two or more.

The copolymeric rubber (A) described above has an intrinsic viscosity [η] determined at 135° C. in decalin solvent ranging from 3.5 to 6.8 dl/g (more preferably 4.3 to 6.0 dl/g). The intrinsic viscosity less than 3.5 dl/g leads to a reduction in the elastic recovery, while one exceeding 6.8 dl/g leads to a undesirable reduction in the processability upon molding. The degree of crystallinity of the copolymeric rubber (A) described above when determined by an X-ray diffraction measurement is preferably 20% or less (more preferably 15% or less). The degree of crystallinity exceeding 20% leads to an undesirable reduction in the flexibility of the copolymeric rubber.

The iodine value of the copolymeric rubber (A) described above which is an ethylene.α-olefin.non-conjugated diene ternary copolymer is preferably 5 to 30, more preferably 7 to 20. The iodine value less than 5 may result in a reduction in the crosslinking density of a molded article made using the thermoplastic elastomer composition of the invention which leads to a poor mechanical property, while one exceeding 30 may result in an excessively high crosslinking density which leads to a poor mechanical property.

The copolymeric rubber (A) may be the one that a vegetable oil (palm oil and the like), an ester of a fatty acid and a higher alcohol (phthalic acid diester, phosphoric acid triester and the like) and the like are contained in it.

The "mineral oil-based softener (B)" described above may for example be a paraffin-based mineral oil, a naphthene-based mineral oil, an aromatic mineral oil and the like. Among those listed above, a paraffin-based mineral oil and/or a naphthene-based mineral oil is preferred.

The "α-olefinic crystalline polymer" (hereinafter referred to simply as "crystalline polymer (C)") has an α-olefin as its main component. That is, the crystalline polymer (C) contains preferably 80% by mole or more of α-olefin, more preferably 90% by mole or more based on 100% by mole of the entire crystalline polymer (C). The content less than 80% by mole may leads to an undesirable reduction in the degree of crystallinity and the melting point of the crystalline polymer (C).

The α-olefin constituting the crystalline polymer (C) described above is preferably an α-olefin having 3 or more carbon atoms, more preferably an α-olefin having 3 to 12 carbon atoms, similarly to the copolymeric rubber (A) described above.

The crystalline polymer (C) may be a homopolymer of the α-olefin described above or a copolymer of two or more α-olefins, or a copolymer with a monomer which is not an α-olefin. The crystalline polymer (C) may be a mixture of two or more of these polymers and/or copolymer to be employed.

In the case the crystalline polymer (C) is a copolymer of the α-olefin with ethylene, the ethylene content is preferably 40% by mole or less (more preferably 20% by mole or less) based on 100% by mole of the entire of this copolymer. The content exceeding 40% by mole leads to an undesirable reduction in the degree of crystallinity and the melting point of the crystalline polymer (C).

When the crystalline polymer (C) is a copolymer, the copolymer may be either of a random copolymer or a block copolymer. For the purpose of obtaining a desired degree of crystallinity, the total content of the constituent units except an α-olefin unit in a random copolymer is preferably 15% by mole or less (more preferably 10% by mole or less) based on 100% by mole of the entire random copolymer. In a block copolymer, the total content of the constituent units except an α-olefin unit is preferably 40% by mole or less (more preferably 20% by mole or less) based on 100% by mole of the entire block copolymer.

The random copolymer described above can be obtained, for example, by a method similar to the method for the copolymeric rubber (A) described above. And the block copolymer described above can be obtained for example by a living polymerization using a Ziegler-Natta catalyst and the like.

The crystalline polymer (C) may for example be polypropylene, propylene-ethylene copolymer, propylene 1-butene copolymer, propylene.1-pentene copolymer, propylene.3-methyl-1-butene copolymer, propylene.1-hexene copolymer, propylene.3-methyl-1-pentene copolymer, propylene.4-methyl-1-pentene copolymer, propylene.3-ethyl-1-pentene copolymer, propylene.1-octene copolymer, propylene.1-decene copolymer, propylene.1-undecene copolymer and the like. Among those listed above, polypropylene and propylene-ethylene copolymer are employed preferably. Any of these polymers may be employed alone or In combination of two or more.

The crystalline polymer (C) has a crystallinity. This crystallinity is ranging from 50 to 100% (more preferably 53% or more, most preferably 55% or more) represented as a degree of the crystallinity determined by an X-ray diffraction measurement.

The degree of crystallinity of the crystalline polymer (C) described above is related closely to the density, and the density of an α-type crystal (monoclinic system) for example of a polypropylene is 0.936 g/cm$^3$, and those of a smetic microcrystal (pseudo-hexagonal system) and an amorphous (atactic) component are 0.886 g/cm$^3$ and 0.850 g/cm$^3$, respectively. The density of an isotactic crystal of a poly-1-butene is 0.91 g/cm$^3$, while the density of an amorphous (atactic) component is 0.87 g/cm$^3$. Accordingly, in order to obtain a crystalline polymer (C) whose degree of crystallinity is 50% or more, then the density is controlled preferably exceeding 0.89 g/cm$^3$ but not more than 0.94 g/cm$^3$ (more preferably 0.90 g/cm or more and not more than 0.94 g/cm$^3$). The degree of crystallinity less than 50% and a density less than 0.89 g/cm$^3$ may lead to a reduction in the heat resistance, the strength and the like.

The maximal peak temperature of the crystalline polymer (C) described above determined by a differential scanning calorimeter, i.e., the melting point (hereinafter abbreviated as Tm) is preferably 100° C. or more (more preferably 120° C. or more). The Tm less than 100° C. may lead to a difficulty in exerting sufficient heat resistance and mechanical strength. The melt flow rate (hereinafter abbreviated as MFR) at 230° C. under a load of 2.16 kg is preferably 0.1 to 100 g/10 minutes (more preferably 0.5 to 80 g/10 minutes). The MFR less than 0.1 g/10 minutes may result in an elastomer composition whose properties such as the kneading processability and the extrusion processability are not satisfactory. On the other hand, the MFR exceeding 100 g/10 minutes may lead to a reduction in the mechanical strength. While the Tm may vary depending on the constituent monomers, it is preferably 120° C. or more.

Accordingly, as the crystalline polymer (C) described above, a polypropylene and/or propylene-ethylene copolymer whose degree of crystallinity is 50% or more, whose density is exceeding 0.89 g/cm$^3$ but not higher than 0.94 g/cm$^3$, whose ethylene unit content is 40% by mole or less, whose Tm is 100° C. or more, and whose MFR is 0.1 to 100 g/10 minutes are particularly preferred.

"α-olefinic amorphous polymer" (hereinafter referred to simply as "amorphous polymer (D)") described above has an α-olefin as its main component. That is the amorphous polymer (D) contains preferably 50% by mole or more, more preferably 60% by mole or more based on 100% by mole of the entire amorphous polymer (D). The content of 50% by mole may leads to an undesirably poor injection fusibility of a thermoplastic elastomer composition.

An α-olefin constituting the amorphous polymer (D) described above is preferably an α-olefin having 3 or more carbon atoms, more preferably an α-olefin having 3 to 12 carbon atoms, similarly to the copolymeric rubber (A) described above.

The amorphous polymer (D) may be either of a homopolymer of an α-olefin or a copolymer of two or more α-olefins, or a copolymer with a monomer which is not an α-olefin. A mixture of two or more of these polymers and/or copolymer may also be employed.

When the amorphous polymer (D) is a copolymer, the copolymer may be either of a random copolymer or a block copolymer. Nevertheless, an α-olefin unit which is a main component in a block copolymer (propylene and 1-butene in the case of the copolymer described above) should be bound in an atactic structure. And when the amorphous copolymer (D) described above is a copolymer with an α-olefin having 3 or more carbon atoms and ethylene, then the α-olefin content preferably 50% by mole or more (more preferably 60 to 100% by mole) based on 100% by mole of the entire copolymer.

The amorphous polymer (D) described above may for example be a homopolymer such as an atactic polypropylene and an atactic poly-1-butene as well as a copolymer of propylene (present in an amount of 50% by mole or more) with another α-olefin (ethylene, 1-butene, 1-pentene, 1-hexene, 4-methyl-1-pentene, 1-octene, 1-decene and the like) or a copolymer of 1-butene (present in an amount of 50% by mole or more) with another α-olefin (ethylene, propylene, 1-pentene, 1-hexene, 4-methyl-1-pentene, 1-octene, 1-decene and the like). Among those listed above, the atactic polypropylene (propylene content of 50% by mole or more), a copolymer of propylene (in an amount of 50% by mole or more) with ethylene and a copolymer of propylene with 1-butene are particularly preferred. Any of these polymers may be employed alone or in combination of two or more.

The atactic polypropylene described above can be obtained as a by-product of a polypropylene employed as the crystalline polymer (C) described above. It is also possible to obtain the atactic polypropylene described above and the atactic poly-1-butene described above by means of a polymerization employing a zirconocene compound—methyl aluminoxane catalyst. The random copolymer described above can be obtained by a method similar to a method for the copolymeric rubber (A) described above. The block copolymer described above can be obtained for example by a living polymerization using a Ziegler-Natta catalyst.

The degree of crystallinity of the non-crystal polymer (D) described above determined by an X-ray diffraction measurement is 0% or more but 50% or less, preferably 30% or less, more preferably 20% or less. This degree of crystallinity is related closely to the density as described above, and a preferred density is 0.85 g/cm$^3$ or more and not more than 0.89 g/cm$^3$ (more preferably 0.85 g/cm$^3$ or more and not more than 0.88 g/cm$^3$).

The number-average molecular weight (hereinafter abbreviated as Mn) of the amorphous polymer (D) described above is preferably 1,000 to 20,000 (more preferably 1,500 to 15,000). The molecular weight less than 1,000 leads to a poor heat resistance of a molded article made using the thermoplastic elastomer composition of the invention, while the molecular weight exceeding 20,000 leads to undesirably poor fluidity and heat fusibility of a thermoplastic elastomer composition of the invention.

The melt viscosity at 190° C. of the amorphous polymer (D) described above is preferably 50,000 cPs or less, more preferably 100 to 30,000 cPs, and most preferably 200 to 20,000 cPs. The melt viscosity exceeding 50,000 cPs leads to a reduction in the strength of adhesion to an article to be bonded. The strength of adhesion to an article to be bonded is, however, reduced even with a melt viscosity exceeding 50,000 cPs. when the degree of crystallinity is exceeding 50% and when the density exceeds 0.89 g/cm$^3$.

The thermoplastic elastomer composition of the invention contains the copolymeric rubber (A), the mineral oil-based softener (B), the crystalline polymer (C), and the amorphous polymer (D). The content of the copolymeric rubber (A) is in an amount of 20 to 65% by mass (more preferably 25 to 60% by mass, most preferably 30 to 60% by mass), the content of the mineral oil-based softener (B) is in an amount of 35 to 78% by mass (more preferably 37 to 75% by mass, most preferably 40 to 60% by mass), the crystalline polymer (C) is in an amount of 1 to 12% by mass (more preferably 2 to 10% by mass, most preferably 2 to 8% by mass) and the amorphous polymer (D) is in an amount of 1 to 12% by mass (more preferably 1 to 10% by mass, most preferably 2 to 8% by mass) based on 100% by mass of the total of these components. It is also preferable that the copolymeric rubber (A) and the mineral oil-based softener (B) are contained in a total amount of 80 to 95% by mass (more preferably 83 to 95% by mass).

The amount of the copolymeric rubber (A) described above less than 20% by mass leads to a reduction in the flexibility of a thermoplastic elastomer composition obtained. On the other hand, the amount of the copolymeric rubber (A) described above exceeding 65% by mass is not preferable since it may lead to a reduction in the heat resistance and the strength of a molded article formed by an injection fusion and may affect the thermoplastic performance adversely. The amount of the mineral oil-based softener (B) described above less than 35% by mass leads to a reduction of the fluidity of a thermoplastic elastomer composition obtained. On the other hand, the amount of the mineral oil-based softener (B) described above exceeding 78% by mass leads to a poor dispersion upon kneading with the crystalline polymer (C) and the amorphous polymer (D) described above.

The amount of the crystalline polymer (C) described above less than 1% by mass leads to a reduction in the strength and the heat resistance of a thermoplastic elastomer composition obtained. On the other hand, the amount of the crystalline polymer (C) described above exceeding 12% by mass leads to an undesirable reduction in the flexibility of a resultant thermoplastic elastomer composition. The amount of the amorphous polymer (D) described above less than 1% by mass leads to a reduction in the adhesiveness upon injection fusing. On the other hand, the amount of the amorphous polymer (D) described above exceeding 12% by mass leads to a reduction in the strength of a molded article by an injection fusion and an excessive adhesiveness of thus obtained thermoplastic elastomer composition, resulting in a poor dispersion upon kneading with the copolymeric rubber (A) and the mineral oil-based softener (B).

Also in the thermoplastic elastomer composition of the invention, at least a part of a mixture containing components (A) to (D) described above is crosslinked. A crosslinking agent employed here is not particularly limited. The crosslinking agent may be the one capable of crosslinking at least one of the copolymeric rubber (A), the crystalline polymer (C) and the amorphous polymer (D) described above, or capable of crosslinking any one with the other by a dynamic crosslinking at a temperature higher than the melting point of the amorphous polymer (D).

The crosslinking agent may for example be an organic peroxide, a phenolic crosslinking agent, a sulfur, a sulfur compound, p-quinone, a p-quinone dioxime derivative, a bismaleimide compound, an epoxy compound, a silane compound, an amino resin and the like, with an organic peroxide and a phenolic crosslinking agent being preferred.

Among the crosslinking agents listed above, the organic peroxide may for example be 1,3-bis(t-butylperoxyisopropyl) benzene, 2,5-dimethyl-2,5-di(t-butylperoxy)hexyne-3,2,5-dimethyl-2,5-di(t-butylperoxy)hexane, α,α'-bis(t-butylperoxy)diisopropylbenzene, dicumyl peroxide, di-t-butyl peroxide, t-butyl peroxide, t-butylcumyl peroxide, p-menthane hydroperoxide, 1,1-bis (t-butylperoxy)-3,3,5-trimethylcyclohexane, dilauroyl peroxide, diacetyl peroxide, t-butyl peroxybenzoate, 2,4-dichlorobenzoyl peroxide, p-chlorobenzoyl peroxide, benzoyl peroxide, di(t-butylperoxy) perbenzoate, n-butyl-4,4-bis(t-butylperoxy) valerate, t-butylperoxyisopropyl carbonate and the like. It is preferable to employ those listed above, especially 1,3-bis(t-butylperoxyisopropyl)benzene, 2,5-dimethyl-2,5-di(t-butylperoxy)hexyne-3,2,5-dimethyl-2,5-di(t-butylperoxy)hexane, α,α'-bis(t-butylperoxy) diisopropylbenzene and the like, any of which has a relatively high decomposition temperature. Any of these organic peroxides may be employed alone or in combination of two or more.

Also in the case the above-mentioned organic peroxide is employed, a crosslinking aid may concomitantly be employed to perform a crosslinking reaction gently, whereby forming an especially uniform crosslink. The crosslinking aid may for example be a sulfur or a sulfur compound (powdered sulfur, colloidal sulfur, precipitated sulfur, insoluble sulfur, surface-treated sulfur, dipentamethylene thiuram tetrasulfide and the like), an oxime compound (p-quinone oxime, p,p'-dibenzoylquinone oxime and the like), a polyfunctional monomer (ethylene glycol di(meth) acrylate, diethylene glycol di(meth)acrylate, triethylene glycol di(meth)acrylate, tetraethylene glycol di(meth)acrylate, polyethylene glycol di(meth)acrylate, trimethylol propane tri(meth)acrylate, diallyl phthalate, tetraallyl oxiethane, triallyl cyanurate, N,N'-m-phenylene bismaleimide, N,N'-toluylene bismaleimide, maleic anhydride, divinylbenzene, zinc di(meth)acrylate and the like. Among those listed above, p,p'-dibenzoylquinone oxime. N,N'-m-phenylene bismaleimide and divinylbenzene are employed preferably. Any of these crosslinking aids may be employed in combination of two or more. Among the crosslinking aid, N,N'-m-phenylene bismaleimide can be employed also as the crosslinking agent since it has a crosslinking effect.

When the organic peroxide described above is employed, the amount to be incorporated is 0.05 to 1.5% by mass (more preferably 0.1 to 1.0% by mass) based on 100% by mass of the total of the copolymeric rubber (A), the crystalline polymer (C) and the amorphous polymer (D) described above. If the amount of the organic peroxide described above is less than 0.05% by mass, the adhesiveness by an injection fusion and the elastic recovery of a molded article formed by the injection fusion tend to become insufficient. On the other hand, the amount exceeding 1.5% by mass may result in a thermoplastic elastomer composition whose processability including the extrusion processability, the kneading processability and the like, are deteriorated.

The amount of the crosslinking aid to be incorporated is preferably 4% by mass or less (more preferably 0.2 to 3% by mass) based on 100% by mass of the total of the copolymeric rubber (A), the crystalline polymer (C), and the amorphous polymer (D) described above. The amount of the crosslinking aid exceeding 4% by mass results in an excessive crosslinking degree, which may lead to a reduction in the adhesiveness upon injection fusing.

Among the crosslinking agents listed above, the phenolic crosslinking agent may for example be a p-substituted phenolic compound, o-substituted phenol-aldehyde condensation product, m-substituted phenol-aldehyde condensation product, a brominated alkylphenol-aldehyde condensation product and the like represented by Formula (1):

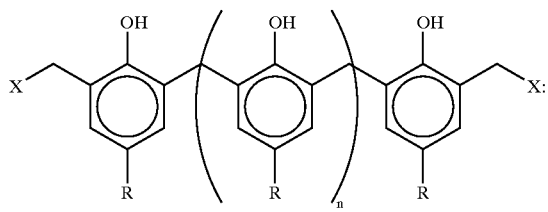

wherein n is an integer of 0 to 10, X is a hydroxyl group, a halogenated alkyl group or a halogen atom, and R is a saturated hydrocarbon group having 1 to 15 carbon atoms. Among these, the p-substituted phenolic compound is preferred particularly.

Such p-substituted phenolic compound can be obtained by means of a condensation reaction between a p-substituted phenol and an aldehyde in the presence of an alkaline catalyst.

In the case of the phenolic crosslinking agent described above is employed, the amount to be incorporated is preferably 0.2 to 10% by mass (more preferably 0.5 to 5% by mass) based on 100% by mass of the copolymeric rubber (A). The amount of the phenolic crosslinking agent less than 0.2% by mass leads to a reduced adhesiveness upon injection fusing and a reduced elastic recovery of a molded part obtained by an injection fusion. On the other hand, the amount exceeding 10% by mass leads to a reduction in the extrusion processability and the injection processability of an elastomer composition.

While the phenolic crosslinking agents may be employed alone, it may be used in combination with a crosslinking promoter for modulating the crosslinking rate. Such crosslinking promoter may for example be a metal halide (stannous chloride, ferric chloride and the like), an organic halide (chlorinated polypropylene, brominated butyl rubber, chloroprene rubber and the like) and the like.

It is further preferable to use a metal oxide such as zinc oxide, a stearic acid, and the like as a dispersant in addition to the crosslinking promoter.

The thermoplastic elastomer composition of the invention may properly contain additives, such as reinforcing agents (carbon black, silica and the like), fillers (clay, talc, calcium carbonate and the like), processing aids, colorants, antioxidants, UV absorbers, anti-aging agents, heat stabilizers, lubricants, releasing agents, flame retardants, foaming agents, antistatic agents, antifungal agents and the like. In addition to the copolymeric rubber (A), the mineral oil-based softener (B), the crystalline polymer (C) and the amorphous polymer (D) described above, other components such as natural rubbers, polyisoprene rubber, polybutadiene rubber, styrene butadiene rubber, acrylonitrile butadiene rubber, butyl rubbers and acryl rubbers may also be contained.

Another type of the thermoplastic elastomer composition of the invention is characterized in that it is comprising a oil-extended rubber (A') composed of a mineral oil-based softener (a1) in an amount of 30% by mass or more and an ethylene.α-olefinic copolymeric rubber (a2) whose intrinsic viscosity [η] determined at 135° C. in decalin solvent is 3.5 to 6.8 dl/g based on 100% by mass of the (a1) and (a2), a post-blend mineral oil-based softener (B'), an α-olefinic crystalline polymer (C) whose degree of crystallinity is 50% or higher and an α-olefinic amorphous polymer (D) whose melt viscosity at 190° C. is 50,000 cPs or less and whose degree of crystallinity is less than 50%, and that at least a part of a mixture containing 30 to 98% by mass of the (A'), 0 to 50% by mass of the (B'), 1 to 12% by mass of the (C) and 1 to 12% by mass of the (D), based on 100% of the total of the (A'), (B'), (C) and (D), is crosslinked.

The "oil-extended rubber" described above (hereinafter sometimes referred to simply as "oil extended rubber (A')") comprises the mineral oil-based softener (a1) and the ethylene.α-olefinic copolymeric rubber (a2) (hereinafter sometimes referred to simply as "copolymeric rubber (a2)").

The "mineral oil-based softener (a1)" described above has previously been contained in the oil-extended rubber (A') described above. The mineral oil-based softener (a1) may for example be one exemplified as the mineral oil-based softener (B) described above. The mineral oil-based rubber (A') described above contains 30% by mass or more, preferably 35 to 80% by mass or more, most preferably 35 to 70% by mass of the mineral oil-based softener (a1) described above. The amount of the mineral oil-based softener (a1) less than 30% by mass leads to a difficulty in obtaining sufficient processability and flexibility of the oil-extended rubber upon producing a thermoplastic elastomer composition.

An example of the copolymeric rubber (a2) and a reason why it is preferred are similar to the description made above with regard to the copolymeric rubber (A).

The post-blend mineral oil-based softener (B') described above may be one exemplified as the mineral oil-based softener (B) described above, and it may be similar to the mineral oil-based softener (a1) described above and a different one from the mineral oil-based softener (a1). In the invention this post-blend mineral oil-based softener (B') may not be contained.

The "α-olefinic crystalline polymer" described above (hereinafter referred to simply as "crystalline polymer (C)") is similar to the α-olefinic crystalline polymer (C) in the first aspect of the invention herein described. The "amorphous polymer (D)" described above (hereinafter referred to simply as "amorphous polymer (D)") is also similar to the amorphous polymer (D) in the first aspect of the invention herein described. The content of the oil-extended rubber (A') is in an amount of 30 to 97% by mass (more preferably 50 to 95% by mass, most preferably 60 to 95% by mass), the content of the post-blend mineral oil-based softener (B') is in an amount of 0 to 50% by mass (more preferably 0 to 40% by mass, most preferably 10 to 35% by mass), the crystalline polymer (C) is in an amount of 1 to 12% by mass (more preferably 2 to 9% by mass, most preferably 2 to 8% by mass) and the amorphous polymer (D) is in an amount of 1 to 12% by mass (more preferably 2 to 9% by mass, most preferably 2 to 8% by mass) based on 100% by mass of the total of these components.

The amount of the oil-extended rubber (A') described above less than 30% by mass leads to a reduction in the flexibility of a thermoplastic elastomer composition obtained. On the other hand, the amount of the oil-extended rubber (A') described above exceeding 98% by mass is not preferably since it may lead to a reduction in the heat resistance and the strength of a molded article formed by an injection fusion and may affect the thermoplastic performance adversely. The amount of the post-blend mineral oil-based softener (B') described above exceeding 50% by mass leads to a poor dispersion upon kneading with the crystalline polymer (C) and the amorphous polymer (D) described above.

The amount of the crystalline polymer (C) described above less than 1% by mass leads to a reduction in the strength and the heat resistance of a thermoplastic elastomer composition obtained. On the other hand, the amount of the crystalline polymer (C) described above exceeding 12% by mass leads to an undesirable reduction in the flexibility of a resultant thermoplastic elastomer composition. The amount of the amorphous polymer (D) described above less than 1% by mass leads to a reduction in the adhesiveness upon injection fusing. On the other hand, the amount of the amorphous polymer (D) described above exceeding 12% by mass leads to a reduction in the strength of a molded article by an injection fusion and an excessive adhesiveness of a resultant thermoplastic elastomer composition, resulting in a poor dispersion upon kneading with the oil-extended rubber (A') and the post-blend mineral oil-based softener (B').

Also in the thermoplastic elastomer composition of the invention, at least a part of a mixture containing Components (A') to (D) described above is crosslinked. A crosslinking agent employed here may be the one exemplified in the invention herein described. When an organic peroxide is employed as the crosslinking agent, it may be used in combination with the crosslinking aid exemplified in the invention described above, whereby forming an especially uniform crosslink.

The thermoplastic elastomer compositon of the invention may contain the additives exemplified in the first aspect of the invention described above such as reinforcing agents or the like.

While a thermoplastic elastomer composition can be obtained by any method, a thermoplastic elastomer composition having excellent characteristics described above can reliably be obtained by adding a crosslinking agent, a crosslinking aid, and the like to a mixture containing certain amounts of the copolymeric rubber (A), the mineral oil-based softener (B), the crystalline polymer (C) and the amorphous polymer (D) followed by dynamic crosslinking. The mineral oil-based softener may be present in a condition (a1) as being contained in the oil-extended rubber (A'), while it may also be employed as the post-blend mineral oil-based softener (B'), as well as in other mixed conditions.

The dynamic crosslinking described above means to give both of a shear force and a heat. This dynamic crosslinking may be accomplished for example by using melting and kneading devices. Among such devices, a device by which a kneading can be conducted may for example be an open mixing roll, a Banbury mixer, a kneader, a continuous extruder; a single screw extruder, an isotropically-rotating continuous twin screw extruder, an anisotropically-rotating continuous twin screw extruder and the like. Among those listed above, a single screw extruder and/or a twin screw extruder are preferred in view of cost, process efficiency and the like. The kneading step may be a batch process or a continuous process.

Accordingly, in the case the total of ①certain amounts of the copolymeric rubber (A), the mineral oil-based softener (B), the crystalline polymer (C) and the amorphous polymer (D), and ②certain amounts of the oil-extended rubber (A'), the post-blend mineral oil-based softener (B'), the crystalline polymer (C) and the amorphous polymer (D) are 100% by mass, respectively, 80 to 98% by mass of the total of the (A) and the (B), or the total of the (A') and the (B'), 1 to 10% by mass of the crystalline polymer (C), and 1 to 10% by mass of the amorphous polymer (D) are incorporated and a primary mixture together with optional additives such as an anti-aging agent or the like, is charged in a batch closed kneader to accomplish a kneading step to obtain a secondary mixture, which is combined with a crosslinking agent to form a tertiary mixture, which is charged in a twin screw extruder, where a shear exothermic dynamic crosslinking is effected, whereby obtaining an inventive composition.

In the case the total of ①certain amounts of the copolymeric rubber (A), the mineral oil-based softener (B), the crystalline polymer (C) and the amorphous polymer (D), and ②certain amounts of the oil-extended rubber (A'), the post-blend mineral oil-based softener (B'), the crystalline polymer (C) and the amorphous polymer (D) are 100% by mass, respectively, 80 to 98% by mass of the total of the (A) and the (B), or the total of the (A') and the (B'), 1 to 10% by mass of the crystalline polymer (C), and 1 to 10% by mass of the amorphous polymer (D) are incorporated and a mixture with a crosslinking agent is charged in a twin screw extruder, where a shear exothermic dynamic crosslinking is effected, whereby obtaining an inventive composition.

While a condition under which a dynamic crosslinking according to the invention can be conducted may vary depending on the melting point of the crystalline polymer (C), the type of the crosslinking agent, the mode of the kneading and the like, the treatment temperature is preferably 120 to 350° C. (more preferably 150 to 290° C.), and the treatment time period is 20 seconds to 20 minutes (more preferably 30 seconds to 15 minutes). A shear force to be given is 10 to 2000/sec as a shear rate (more preferably 100 to 1000/sec).

PREFERRED EMBODIMENTS OF THE INVENTION

[1] Preparation of Thermoplastic Elastomer Composition

The following a copolymeric rubber (A) or an oil-extended rubber (A'), a mineral oil-based softener (B) or a post-blend mineral oil-based softener (B'), a crystalline polymer (C), a amorphous polymer (D) and other additives in amounts shown in Table 1 were mixed to obtain a mixture. This mixture was charged into a pressurizing kneader (capacity:10 L, Moriyama Co. Ltd.) which had previously been heated at 150° C. and kneaded at 40 rpm for 15 minutes until the crystalline polymer (C) was melted and each component was dispersed uniformly. The molten composition thus obtained was subjected to a FEEDERRUDER (Moriyama Co., Ltd.), where the composition was pelletized. The resultant pellet was supplemented with the following crosslinking agent in an amount shown in Table 1, mixed by a Henschel mixer (Mitsui-Mining Co., Ltd.) for 30 seconds, and then fed to a twin screw extruder (intermeshing co-rotating screw, ratio of screw flight length L and screw diameter D (L/D)=33.5, Ikegai Corp., Model PCM-45) where the mixture was subjected to a dynamic crosslinking at 200° C. and 300 rpm over a residential time of 2 minutes and extruded as a pelletized thermoplastic elastomer composition of any of 13 types (5 Examples and 8 Comparatives).

The followings are employed as copolymeric rubbers (A) and oil-extended rubbers (A').

Rubber 1 (Oil-Extended): Ethylene.propylene.5-ethylidene-2-norbornene terpolymer (ethylene content:66% by mass, propylene content: 29.5% by mass, 5-ethylidene-2-norbornene content: 4.5% by mass, intrinsic viscosity:4.7) content: 50% by mass, and Mineral oil-based softener (Idemitsu Kosan Co., Ltd. trade name: PW-380) content: 50% by mass Rubber 2 (oil-extended): Ethylene.propylene.5-ethylidene-2-norbornene terpolymer (ethylene content: 66% by mass, propylene content: 29.5% by mass, 5-ethylidene-2-norbornene content: 4.5% by mass, intrinsic viscosity:3.8) content: 60% by mass, and Mineral oil-based softener (Idemitsu Kosan Co., Ltd. trade name: PW-380) content: 40% by mass Rubber 3 (oil-extended): Ethylene.propylene.5-ethylidene-2-norbornene terpolymer (ethylene content:66% by mass, propylene content: 29.5% by mass, 5-ethylidene-2-norbornene content: 4.5% by mass, intrinsic viscosity:2.8) content: 80% by mass, and Mineral oil-based softener (Idemitsu Kosan Co, Ltd., trade name "PW-380") content: 20% by mass Rubber 4: Ethylene.propylene.5-ethylidene-2-norbornene terpolymer (ethylene content: 66% by mass, propylene content: 29.5% by mass, 5-ethylidene-2-norbornene content: 4.5% by mass, intrinsic viscosity:2.2)

As the mineral oil-based softener (B) or the post-blend mineral oil-based softener (B'), "PW-380" manufactured by Idemitsu Kosan Co., Ltd. was employed. The followings are employed as the crystalline polymer (C) and the amorphous polymer (D).

Crystalline polymer (C): Propylene.ethylene random copolymer

Density: 0.90 g/cm$^3$, MFR (230° C. under 2.16 kg): 23 g/10 min, NIPPON POLYCHEM CO., LTD., trade name "FL25R"

Amorphous polymer (D): Propylene.1-butene amorphous copolymer

Propylene content: 71% by mole, Melt viscosity: 8000 cPs (190° C.), density: 0.87 g/cm$^3$, Mn 6,500, Ube Industries Ltd., trade name "UBETAC APAO UT 2780"

The followings are employed as crosslinking agents.

Crosslinking agent 1: 2,5-Dimethyl-2,5-di(t-butylperoxy) hexane, NOF Corp., trade name "PERHEXA 25B-40"

Crosslinking agent 2: Divinylbenzene, purity:56%, manufactured by Sankyo Kasei Co., Ltd.

Also as another additive, the following anti-aging agent was employed.

Anti-aging agent: Chiba specialty Chemicals Co., Ltd., "IRGANOX 1010"

TABLE 1

| Oil-extended rubber or co-polymeric rubber | Intrinsic viscosity (dl/g) | Softener content (% by mass) | Example | | | | | Comparative Example | | | | | | | |
|---|---|---|---|---|---|---|---|---|---|---|---|---|---|---|---|
| | | | 1 | 2 | 3 | 4 | 5 | 1 | 2 | 3 | 4 | 5 | 6 | 7 | 8 |
| Formulation | | | | | | | | | | | | | | | |
| Rubber 1 | 47 | 50 | 65 | 85 | | | 65 | | | | | | | 85 | |
| Rubber 2 | 3.8 | 40 | | | 65 | 65 | | | | | 85 | 65 | 75 | | 65 |
| Rubber 3 | 2.8 | 20 | | | | | | 85 | 65 | | | | | | |
| Rubber 4 | 2.2 | 0 | | | | | | | | 65 | | | | | |
| Post-blend mineral oil-based softener | | | 23 | | 20 | 23 | 15 | | 20 | 20 | | | | | 20 |
| Crystalline polymer | | | 6 | 7 | 7 | 6 | 10 | 7 | 7 | 7 | 7 | 17 | 12 | 15 | 15 |
| Non-crystalline polymer | | | 6 | 8 | 8 | 6 | 10 | 8 | 8 | 8 | 8 | 18 | 13 | | |
| Anti-aging agent | | | | | 0.1 | | | | | | | 0.1 | | | |
| Crosslinking agent 1 | | | | | 1 | | | | | | | 1 | | | |
| Crosslinking agent 2 | | | | | 1.25 | | | | | | | 1.25 | | | |
| Characterization | | | | | | | | | | | | | | | |
| MFR [g/10 min] | | | 120 | 110 | 70 | 42 | 200 | 2.1 | 10 | 0.7 | 4 | >300 | >300 | 3.1 | 3 |
| Hardness (JIS-A) | | | 32 | 39 | 35 | 34 | 37 | 55 | 50 | 51 | 42 | 68 | 64 | 60 | 57 |
| Tensile strength at break [MPa] | | | 3.3 | 4.2 | 3.8 | 4.1 | 4.4 | 5 | 4.8 | 5.9 | 4.1 | 6.9 | 6.4 | 6.7 | 5.5 |
| Tensile elongation at break [%] | | | 640 | 660 | 740 | 660 | 760 | 460 | 500 | 470 | 640 | 620 | 720 | 600 | 540 |
| Compression set [%] | | | 28 | 29 | 26 | 32 | 33 | 38 | 40 | 40 | 42 | 50 | 45 | 25 | 41 |
| Rubbery texture | | | ◎ | ◎ | ◎ | ◎ | ◎ | ∆ | ∆ | ∆ | ○ | X | X | X | X |
| Injection fusibility (folding resistance) | | | ○ | ○ | ○ | ○ | ○ | X | ∆ | X | X | ○ | ○ | X | X |

[2] Preparation of Test Piece of Molded Article Made Using Thermoplastic Elastomer Composition The thermoplastic elastomer composition obtained in Section [1] was subjected to an injection molding machine (JSW Co., Ltd., model N-100) where a test piece of 120× 120×2 mm of any of 13 types (5 Examples and 8 Comparatives) was injection-molded.

[3] Preparation of Substrate Article from Olefinic Vulcanized Rubber

100 Parts by mass of ethylene.propylene.5-ethylidene-2-norbornene terpolymer (JSR Corp., trade name "EP 103A") was combined with 145 parts by mass of a carbon black (Tokai Carbon Co., Ltd., trade name: "SEAST 116"), 85 parts by mass of a paraffin-based process oil (Idemitsu Kosan Co., Ltd., trade name: "PW380"), 5 parts by mass of an activated zinc oxide (Sakai Chemical Industry Co., Ltd.), 1 part by mass of stearic acid (Kao Corp., trade name: "LUNAC S"), 1 part by mass of a processing aid (Hitachi Chemical Co., Ltd., trade name: "HITANOL 1501"), 2 parts by mass of a releasing agent (SIL AND SEIHARER, trade name: "STRUCTOL WB212") and 1 part by mass of a plasticizer (polyethylene glycol) to obtain a mixture.

This mixture was kneaded using a 3-L Banbury mixer (Kobe Steel, Ltd.) at 50° C. and 70 rpm over a kneading period of 2.5 minutes. Then, 10 parts by mass of a dehydrating agent (Inoue Sekkai Kogyo, trade name: "BESTA PP"), a vulcanizing aid (Ouchishinko Chemical Industrial Co., Ltd., trade name "NOCCELER M" in 1 part by mass, trade name "NOCCELER PX" in 1 part by mass, trade name "NOCCELER TT" in 0.5 part by mass, trade name "NOCCELER D" in 1 part by mass) and 2.2 parts by mass of a sulfur were added and the mixture was kneaded using a 6-inch open roll (Kansai Roll Corp.) at 50° C. Subsequently, the mixture was vulcanized at 170° C. for 10 minutes to obtain a 120 mm-square 2-mm thick vulcanized rubber sheet. This sheet was cut using a dumb-bell cutter (Dumb-bell Corp.) into a 60 mm-long 50 mm-wide piece to obtain a substrate article.

[4] Preparation of Test Piece Injection-Fused with Thermoplastic Elastomer Composition The inner wall of the mold cavity of an injection molding machine (JSW Co., Ltd., model N-100) was lined with a substrate article (120×120×2 mm test piece having a 60×50×2 mm void) obtained in Section [3], into which each thermoplastic elastomer obtained in Section [1] was injected so that it was accommodated in the void described above, whereby obtaining a plate (120×100×2 mm) of an olefinic vulcanized rubber (substrate article) fused with the thermoplastic elastomer of any of 13 types (5 Examples and 8 Comparatives).

[5] Evaluation of Thermoplastic Elastomer Compositions
(1) Evaluation of Non-Crosslinked Material The fluidity of the thermoplastic elastomer composition obtained in Section [1] was determined as a melt flow rate at 230° C. under a load of 10 kg, and is shown in Table 1.
(2) Evaluation of Crosslinked Molded Article A molded article made using the thermoplastic elastomer composition obtained in Section [2] was examined for its hardness, compression set, tensile strength at break, tensile elongation at break and texture by the following method, and the results are shown in Table 1.
(i) Hardness: A JIS-A hardness was determined in accordance with JIS-K6253.
(ii) Compression set: A measurement was in accordance with JIS-K6262 under the condition involving 70° C., 22 hours and 25% compression.
(iii) Tensile strength at break and tensile elongation at break: A measurement was in accordance with JIS-K6251.
(iv) Texture: The rubbery texture was evaluated by touching. In Table 1, the symbols ⊚, ○, Δ and X are indicated based on the following evaluation criteria.
⊚: Texture extremely close to vulcanized rubber
○: Vulcanized rubber-mimicking but slightly resin-like texture
Δ: Resin-like but slightly vulcanized rubber-mimicking texture
X: Resin-like texture

[6] Evaluation of Injection Fusibility of Thermoplastic Elastomer Composition

A test piece fused with the thermoplastic elastomer composition obtained in Section[4] was folded by an angle of 180° at the position where the thermoplastic elastomer composition and the substrate article was bonded, and the way how they are peeled apart was observed visually and the results are included in Table 1.

In Table 1, the symbols ○, Δ and X are indicated based on the following evaluation criteria.
○: No peeling off
Δ: Partial peeling off
X: Peeling off and break Results According to the results shown in Table 1, each of the inventive thermoplastic elastomer compositions of Examples 1 to 5 was highly fluid as reflected by MFR ranging from 42 to 200 g/10 min. The hardness was as particularly low as 32 to 39. The compression set was also as extremely low as 28 to 33%. The texture of each composition was very similar to that of a rubber, suggesting an excellent rubbery property. With regard to an injection fusibility, any of the inventive compositions exhibited no peeling or break, suggesting an excellent injection fusibility.

On the other hand, any of Comparatives 1 to 3 exhibited a poor fluidity, a high hardness and a poor rubbery texture because of the intrinsic viscosity of the ethylene.α-olefinic copolymeric rubber contained in the copolymeric rubber (A) or the oil-extended rubber (A') as low as 2.8 dl/g. Furthermore, the folding after the injection fusion resulted in a peeling or a break. Comparative 4 has an extremely poor fluidity because of a small amount of the mineral oil-based softener added. Also with regard to the injection fusibility, a peeling and a break occurred. Each of Comparatives 5 and 6 has a high hardness and a high compression set which reflect a highly resin-like nature, since it contained a small total amount of the copolymeric rubber (A) or the oil extended rubber (A') and a mineral oil-based softener (B) which was departed from the range herein specified. Each of Comparatives 7 and 8 had a poor fluidity, a high hardness and a poor rubbery texture since it contained no amorphous polymer (D). Furthermore with regard to the injection fusibility, the folding resulted in a peeling or a break.

The present invention is not limited to Examples specified above and can be modified in various ways depending on purposes and applications without departing the scope of the invention. Thus, in addition to an injection molding, any other molding process, such as extrusion molding, blow molding, compression molding, vacuum molding, lamination molding, calendar molding, and the like also allows the excellent processability to be exerted. In addition, any secondary processing such as foaming, stretching, binding, printing, painting, plating, and the like can readily be conducted.

INDUSTRIAL APPLICABILITY

According to the invention, a thermoplastic elastomer composition having an excellent processability which can readily be handled with injection molding, extrusion molding, blow molding, compression molding, vacuum molding, lamination molding, calendar molding and the like can be obtained. It is also possible to obtain a thermoplastic elastomer composition having an excellent ability of being fused by an injection with a vulcanized rubber (especially with both of an olefinic vulcanized rubber and an olefinic non-vulcanized rubber) and an extremely rubber-like property.

A thermoplastic elastomer composition of the invention can especially be applied to various fabricated composites having injection-fused parts, and can widely be employed also in automobile bumpers, exterior moldings, window sealing, door sealing gaskets, trunk sealing gaskets, roof side rails, emblems, interior and exterior skin materials, weather strips, as well as sealing materials or interior and exterior skin materials for aircrafts and seacrafts, sealing materials, interior and exterior skin material or water-proof sheet materials for constructing and building, sealing materials for general machines and devices, packings and housings for light electric appliances, and general fabricated products such as miscellaneous daily goods and sport goods.

What is claimed is:

1. A thermoplastic elastomer composition comprising an ethylenei.α-olefinic copolymeric rubber (A) whose intrinsic viscosity determined at 135° C. in decalin solvent is 3.5 to 6.8 dug, a mineral oil-based softener (B), an c-olefinic crystalline polymer (C) whose degree of crystallinity is 50% or higher and an a-olefinic amorphous polymer (D) whose melt viscosity at 190° C. is 50,000 cPs or less and whose degree of crystallinity is less than 50%, wherein at least a part of a mixture containing 20 to 63% by mass of said (A), 35 to 78% by mass of said (B), Ito 12% by mass of said (C) and 1 to 12% by mass of said (D), based on 100% by mass of the total of said (A), (B), (C) and (D), is crosslinked.

2. The thermoplastic elastomer composition according to claim 1 wherein said ethylenei.α-olefinic copolymeric (A) is an ethylenei.α-olefin copolymeric and/or an ethylene.α-olefin.non-conjugated diene ternary copolymer.

3. The thermoplastic elastomer composition according to claim 1 wherein gravity of said α-olefinic crystalline polymer (C) ranges from 0.89 g/cm$^3$ to 0.94 g/cm$^3$.

4. The thermoplastic elastomer composition according to claim 1 wherein said a-olefinic crystalline polymer (C) is one or more polymers selected from the group consisting of polypropylene, propylene.ethylene copolymer, propylene 1-butene copolymer, propylene.1-pentene copolymer, propylene.3-methyl-1-butene copolymer, propylene.1-hexene copolymer, propylene.3-methyl-1-pentene copolymer, propylene.4-methyl-1-pentene copolymer, propylene.3-ethyl-1-pentene copolymer, propylene.1-decene copolymer, propylene.1-decene copolymer and propylene.1-undecene copolymer.

5. The thermoplastic elastomer composition according to claim 1 wherein gravity of said α-olefinic amorphous polymer (D) ranges from 0.85 g/cm$^3$ to 0.89 g/cm$^3$.

6. The thermoplastic elastomer composition according to claim 1 wherein said α-olefinic amorphous polymer (D) is one or more polymers selected from the group consisting of atactic polypropylene, poly-1-butene, a copolymer of propylene in an amount of at least 50% by mole with ethylene, a copolymer of propylene in an amount of at least 50% by mole with 1-butene, a copolymer of propylene in an amount of at least 50% by mole with 1-pentene, a copolymer of propylene in an amount of at least 50% by mole with 1-hexene, a copolymer of propylene in an amount of at least 50% by mole with 4-methyl-1-pentene, a copolymer of propylene in an amount of at least 50% by mole with 1-octene, a copolymer of propylene in an amount of at least 50% by mole with 1-decene, and a copolymer of 1-butene in an amount of at least 50% by mole with ethylene, a copolymer of 1-butene in an amount of at least 50% by mole with propylene, a copolymer of 1-butene in an amount of at least 50% by mole with 1-pentene, a copolymer of 1-butene in an amount of at least 50% by mole with 1-hexene, a copolymer of 1-butene in an amount of at least 50% by mole with 4-methyl-1-pentene, a copolymer of 1-butene in an amount of at least 50% by mole with 1-octene, and a copolymer of 1-butene in an amount of at least 50% by mole with 1-decene.

7. A thermoplastic elastomer composition comprising a an oil-extended rubber (A') composed of a mineral oil-based softener (a1) in an amount of 30% by mass or more and an ethylene.α-olefinic copolymeric rubber (a2) whose intrinsic viscosity determined at 135° C. in decalin solvent is 3.5 to 6.8 dug based on 100% by mass of said (a1) and (a2), a post-blend mineral oil-based softener (B'), an α-olefinic crystalline polymer (C) whose degree of crystallinity is 50% or higher and an x-olefinic amorphous polymer (D) whose melt viscosity at 190° C. is 50,000 cPs or less and whose degree of crystallinity is less than 50%, wherein at least a part of a mixture containing 30 to 98% by mass of said (A'), 0 to 50% by mass of said (B'), 1 to 12% by mass of said (C) and 1 to 12% by mass of said (D), based on 100% of the total of said (A'), (B'), (C) and (D), is crosslinked.

8. The thermoplastic elastomer composition according to claim 7 wherein said ethylene.α-olefinic copolymeric rubber (a2) is an ethylene.α-olefin binary copolymer and/or an ethylene.α-olefin non-conjugated diene ternary copolymer.

9. The thermoplastic elastomer composition according to claim 7 wherein gravity of said α-olefinic crystyalline polymer (C) is-exceeding ranges from 0.89 g/cm$^3$ to 0.94 g/cm$^3$.

10. The thermoplastic elastomer composition according to claim 7 wherein said x-olefinic crystalline polymer (C) is least one or more polymers selected from the group consisting of polypropylene, propylene-ethylene copolymer, propylene.1-butene copolymer, propylene.1-pentene copolymer, propylene.3-methyl-1-butene copolymer, propylene.1-hexene copolymer, propylene.3-methyl-1-pentene copolymer, propylene.4-methyl-1-pentene copolymer, propylene.3-ethyl-1-pentene copolymer, propylene.1-octene copolymer, propylene.1-decene copolymer and propylene.1-undecene copolymer.

11. The thermoplastic elastomer composition according to claim 7 wherein gravity of said α-olefinic amorphous polymer (D) ranges from 0.85 g/cm$^3$ to 0./89 g/cm$^3$.

12. The thermoplastic elastomer composition according to claim 7 wherein said α-olefinic amorphous polymer (D) is least one or more polymers selected from the group consisting of atactic polypropylene, atactic poly-1-butene a copolymer of propylene in an amount of at least 50% by mole with ethylene, a copolymer of propylene in an amount of at least 50% by mole with 1-butene, a copolymer of propylene in an amount of at least 50% by mole with 1-pentene, a copolymer of propylene in an amount of at least 50% by mole with 1-hexene, a copolymer of propylene in an amount of at least 50% by mole with 4-methyl-1-pentene, a copolymer of propylene in an amount of at least 50% by mole with 1-octene, a copolymer of propylene in an amount of at least 50% by mole with 1-decene, and a copolymer of 1-butene in an amount of at least 50% by mole mere with ethylene, a copolymer of 1-butene in an amount of at least 50% by mole with propylene, a copolymer of 1-butene in an amount of at least 50% by mole with 1-pentene a copolymer of 1-butene in an amount of at least 50% by mole with 1-hexene, a copolymer of 1-butene in an amount of at least 50% by mole with 4-methyl-1-pentene, a copolymer of 1-butene in an amount of at least 50% by mole with 1-octene, and a copolymer of 1-butene in an amount of at least 50% by mole with 1-decene.

13. The thermoplastic elastomer composition according to claim 6 wherein said ethylene.α-olefinic copolymer rubber (A) is an ethylene.α-olefin binary copolymer and/or an ethylene.α-olefin.non-conjugated diene ternary copolymer.

14. The thermoplastic elastomer composition according to claim 6 wherein gravity of said α-olefinic crystalline polymer (C) ranges from 0.89 g/cm$^3$ to 0.94 g/cm$^3$.

15. The thermoplastic elastomer composition according to claim 6 wherein said α-olefinic crystalline polymer (C) is one or more polymers selected from the group consisting of polypropylene, propylene ethylene copolymer, propylene.1-butene copolymer, propylene.1-pentene copolymer, propylene.3-methyl-1-butene copolymer, propylene.1-hexene copolymer, propylene.3-methyl-1-pentene copolymer, propylene.4-methyl-1-pentene copolymer, propylene.3-ethyl-1-pentene copolymer, propylene.1-octene copolymer, propylene.1-decene copolymer and propylene.1-undecene copolymer.

16. The thermoplastic elastomer composition according to claim 6 wherein gravity of said α-olefinic amorphous polymer (D) ranges from 0.85 g./cm³ to 0.89 g/cm³.

17. The thermoplastic elastomer composition according to claim 1 wherein crystallinity of said α-olefinic crystalline polymer (C) is 53% or more and crystallinity of said α-olefinic amorphous polymer (D) is 30% or less.

18. The thermoplastic elastomer composition according to claim 12 wherein said ethylene.α-olefinic copolymeric rubber (a2) is an ethylene.α-olefin binary copolymer and/or an ethylene.α-olefin.non-conjugated diene ternary copolymer.

19. The thermoplastic elastomer composition according to claim 12 wherein gravity of said α-olefinic crystalline polymer (C) ranges from 0.89 g/cm³ to 0.94 g/cm³.

20. The thermoplastic elastomer composition according to claim 12 wherein said α-olefinic crystalline polymer (C) is one or more polymers selected from the group consisting of polypropylene, propylene.ethylene copolymer, propylene.1-butene copolymer, propylene.1-pentene copolymer, propylene.3-methyl-1-butene copolymer, propylene.1-hexene copolymer, propylene.3-methyl-1-pentene copolymer, propylene.4-methyl-1-pentene copolymer, propylene.3-ethyl-1-pentene copolymer, propylene.1-octene copolymer, propylene.1-decene copolymer and propylene.1-undecene copolymer.

21. The thermoplastic elastomer composition according to claim 12 wherein gravity of said α-olefinic amorphous polymer (D) ranges from 0.85 g/cm³ to 0.89 g/cm³.

22. The thermoplastic elastomer composition according to claim 7 wherein crystallinity of said a-olefinic crystalline polymer (C) is 53% or more and crystallinity of said α-olefinic amorphous polymer (D) is 30% or less.

* * * * *